United States Patent [19]

Bagnall et al.

[11] Patent Number: 4,558,202
[45] Date of Patent: Dec. 10, 1985

[54] WELDMENT FOR AUSTENITIC STAINLESS STEEL AND METHOD

[75] Inventors: Christopher Bagnall; Marvin A. McBride, both of Hempfield, Pa.

[73] Assignee: The United States of America as represented by the Department of Energy, Washington, D.C.

[21] Appl. No.: 523,992

[22] Filed: Aug. 17, 1983

[51] Int. Cl.$^4$ .............................................. B23K 9/23
[52] U.S. Cl. ............................ 219/137 WM; 219/118; 228/263.15; 428/685
[58] Field of Search .......... 219/137 WM, 118, 137 R; 428/685, 682; 228/263.15

[56] References Cited

U.S. PATENT DOCUMENTS

| | | | |
|---|---|---|---|
| 2,638,665 | 5/1953 | Viles | 219/137 WM |
| 2,908,801 | 10/1959 | Cresswell | 219/118 X |
| 3,466,418 | 9/1969 | Webb | 219/118 X |
| 3,785,787 | 1/1974 | Yokota et al. | 428/685 X |
| 4,390,777 | 6/1983 | Thomas et al. | 219/127 |

Primary Examiner—Roy N. Envall, Jr.
Assistant Examiner—Catherine M. Sigda
Attorney, Agent, or Firm—James W. Weinberger; Robert J. Fisher; Judson R. Hightower

[57] ABSTRACT

For making defect-free welds for joining two austenitic stainless steel members, using gas tungsten-arc welding, a thin foil-like iron member is placed between the two steel members to be joined, prior to making the weld, with the foil-like iron member having a higher melting point than the stainless steel members. When the weld is formed, there results a weld nugget comprising melted and then solidified portions of the joined members with small portions of the foil-like iron member projecting into the solidified weld nugget. The portions of the weld nugget proximate the small portions of the foil-like iron member which project into the weld nugget are relatively rich in iron. This causes these iron-rich nugget portions to display substantial delta ferrite during solidification of the weld nugget which eliminates weld defects which could otherwise occur. This is especially useful for joining austenitic steel members which, when just below the solidus temperature, include at most only a very minor proportion of delta ferrite.

17 Claims, 10 Drawing Figures

WELDMENT FOR AUSTENITIC STAINLESS STEEL AND METHOD

GOVERNMENT CONTRACT

This invention was conceived during a performance of a Government Contract designated DE-AM02-76CH94000.

CROSS-REFERENCE TO RELATED APPLICATION

In copending application Ser. No. 245,487, filed Mar. 19, 1981, by K. C. Thomas, E. D. Jones and M. A. McBride, one of the present applicants, titled "Fusion Welding Process" and initially filed by the present assignee, is disclosed a process for welding austenitic stainless steel members which have a high nickel content by formation of a pellet-receiving aperture within one of the members to be welded, and then inserting into the aperture a pellet formed of an alloy comprising delta-ferrite-forming material. The weld is then performed by gas tungsten-arc welding (GTAW) and the pellet becomes a part of the resulting nugget by fusion with the melted stainless steel metal of the members to be joined. Because of the presence of delta-ferrite-forming phases in the resulting weld nugget, improved welds are obtained.

BACKGROUND OF THE INVENTION

This invention relates to weldments of austenitic stainless steel components and method and, more particularly, to weldments and method for assembling stainless steel grids to ducts for fuel assemblies for liquid-metal-cooled nuclear reactors.

A fuel assembly for a liquid-metal-cooled nuclear reactor includes a plurality of cylindrical fuel rods supported within a duct by spacer grids. The ducts and grids have typically been fabricated of Type 316 stainless steel. The grids must be accurately located and permanently attached to the duct. In past practices, the grids have been attached to the ducts using the gas tungsten-arc welding (GTAW) process wherein the two pieces to be joined are clamped by a suitable fixture and the weld made by experimentally optimized choice of welding parameters. Such welds have been successful using 18Cr-8Ni stainless steel.

The aforementioned copending application Ser. No. 245,487 addressed the problem of producing a sound weld joint in an advanced austenitic stainless steel alloy containing more nickel and less chromium than previously employed. The welds were successfully accomplished in the manner as described by utilization of the delta-ferrite-forming insert.

It is desirable in some cases to use grid straps having a thickness such as 0.02 inch (0.5 mm) and a relatively heavy duct wall having a thickness such as 0.12 inch (3 mm). With this thickness of duct wall, heat transfer through the relatively thick member to the much thinner grid strap presents a major problem. With advanced high-nickel, stainless steel alloys such as alloy D9, weld results became erratic.

In the process described in aforementioned copending application Ser. No. 245,487, welding was accomplished from the outside surface of the relatively heavy-walled duct. In order to improve heat transfer to the thin grid member, it was attempted to move the welding torch to the inside surface of the duct so that heat transfer initially occurred through the thin grid member. While satisfactory welds could generally be made utilizing Type 316 stainless steel, with advanced alloys such as alloy D9, severe cracking occured at the interface between the joint members and into the spot weld or weld nugget. The nature of the defects were classified in metallurgical terms as "solidification cracking".

SUMMARY OF THE INVENTION

There is provided a defect-free weldment and a method for making such a weldment for joining austenitic stainless steel members which have a melting point lower than that of pure iron and which, when just below the solidus temperature, include at most only a very minor proportion of delta ferrite. The weldment comprises a weld nugget which joins one of the stainless steel members to the other of the members and comprises portions of these members which have been melted and then solidified. A thin foil-like member substantially comprising iron is positioned intermediate the welded members and proximate the weld nugget. The foil-like member has a melting point greater than the welded stainless steel members and small unmelted portions of the thin foil-like member project into the weld nugget. The portions of the weld nugget which are proximate the projecting portions of the thin foil-like member are relatively rich in iron in order that delta ferrite is formed proximate these foil-like member projecting portions during solidification of the weld nugget. This weldment is particularly adapted for joining a thin stainless steel member to a heavier stainless steel member and in making the weld, the welding torch is placed proximate the exposed portion or surface of the relatively thin stainless steel member.

BRIEF DESCRIPTION OF THE DRAWINGS

For a better understanding of the invention, reference may be had to the preferred embodiment, exemplary of the invention, shown in the accompanying drawings in which.

DESCRIPTION OF THE PREFERRED EMBODIMENTS

Figure 1:
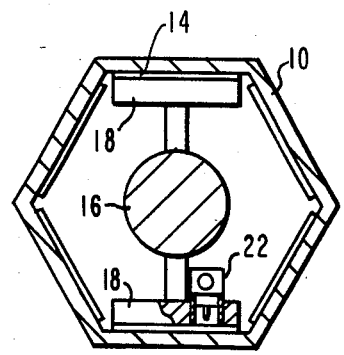
FIG. 1 is a fragmentary elevational view, shown partly in section, of a fuel assembly grid and duct during the welding operation.
Figure 2:
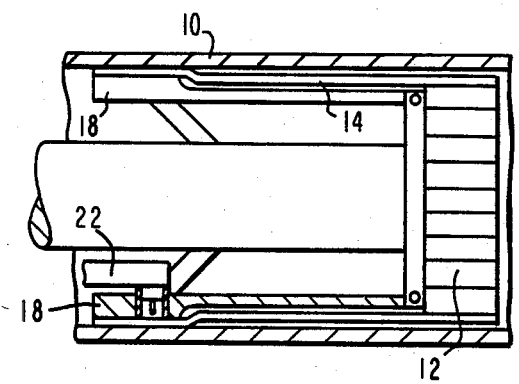
FIG. 2 is a side elevation of FIG. 1 shown partly in section.

In FIGS. 1 and 2 are shown the hexagonal duct 10 in which a honeycomb grid 12 is being attached by welding a grid support strap 14 to the duct 10. To facilitate holding the honeycomb grid 12 and support strap in proper position during the welding operation, an expandable clamp 16 is used to apply a radial pressure to the weld fixture pressure pad 18 in order to retain in fixed and abutting relationship the portion of the grid strap 14 which is to be welded to the hexagonal duct 10.

Figure 3:
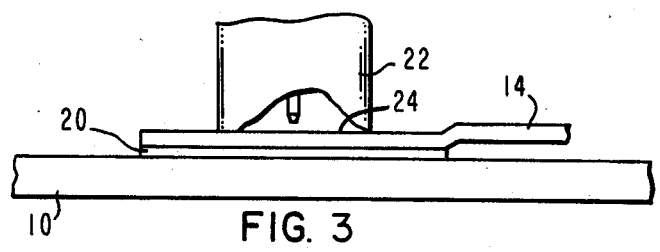
FIG. 3 is an enlarged fragmentary view, partly broken away, illustrating details of the welding operation.

Prior to insertion of the clamp 16 into the duct 10, there is placed between the portions of the duct 10 and grid support 14 which are to be welded a thin foil-like member 20 shown in FIG. 3 substantially comprising iron and when pressures are applied by the clamp 16, the members to be welded are retained in fixed and abutting relationship with the foil-like member 20 positioned therebetween. A conventional gas tungsten-arc welding torch 22 is positioned proximate the exposed surface 24 of the grid support strap 14 which is to be welded.

The details of the welding arrangement are shown in the enlarged view of FIG. 3 wherein the hexagonal duct 10, support strap 14 and thin foil-like iron member 20 are all maintained in fixed and abutting relationship by the weld fixture pressure pad, as shown in FIGS. 1 and 2. The weld is then effected by means of the welding torch 22 positioned proximate the exposed surface 24 of strap 14.

Briefly reviewing the present development, in prior art practices, successful welds using the GTAW process have been made using Type 312 stainless steel formed as a pellet and which has the following composition: 30% Cr; 9% Ni; 2,5% Mn; 0.9% Si; 0.15% C; and the balance Fe. It is also desirable to use different stainless steel compositions, especially those having a lower chromium and higher nickel content, such as composition D9 which is formed of 13% Cr; 15% Ni; 0.05% C; 1.5% Mo; 1.8% Mn; 0.25% Ti; and the balance Fe. Welds made with D9 stainless steel using the GTAW process have characteristically shown numerous defects. As previously described, in an attempt to overcome these defects, the weld was effected from the outside surface of the duct 10 utilizing the preformed aperture with the plug material in accordance with the teachings set forth in heretofore referenced copending application Ser. No. 245,487, filed Mar. 19, 1981. When welding a grid support strap 14 to a duct 10, however, some difficulties are encountered. This is especially true with a thicker duct wall, which for the embodiment as shown in these Figures is 0.12 inch (3 mm) thick, with the thickness of the grid strap being 0.02 inch (0.5 mm). In such case, when welding was attempted from the outside surface of the duct, heat transfer through the relatively thick duct to the much thinner grid strap constituted a major problem. Even with the use of the insert as disclosed in aforementioned copending application Ser. No. 245,487, filed Mar. 19, 1981, it was very difficult to maintain intimate contact between the insert and the alloy D9 duct, resulting in erractic welds.

When attempting to move the welding torch 22 to the interior of the duct 10, in order to effect good heat transfer to the thin grid support strap 14 in the manner generally as shown in FIGS. 1-3, the majority of the resulting welds were rejected due to severe cracking at the interface between the joint members and into the spot weld. As noted hereinbefore, these defects are classified in metallurgical terms as "solidification cracking". From this it was evident that the shrinkage strains could not be accomodated and that the crack initiated at the notch between the two joint members.

In accordance with the present invention and as described hereinbefore, there is positioned between the two stainless steel members 10 and 14 to be welded a thin foil-like member 20 which substantially comprises iron and which has a melting point which is higher than that of the austenitic stainless steel members which are to be welded. As a specific example, alloy D9 has a melting point of 2500° F.–2550° F., and the iron shim or foil-like member 20 has a melting point of 2802° F. the thickness of the iron member is not particularly critical and as an example, it has a thickness of 0.003 inch (76 microns). The duct 10 has a thickness of 0.120 inch (3 mm) and the grid support 14 has a thickness of 0.02 inch (0.5 mm).

The proper welding parameters are optimized for the application and for the specific example considered hereinbefore, a welding current of 50 amperes is applied for 5 seconds, using a tungsten electrode having a diameter of 0.062 inch, a gap between the electrode and workpiece of 0.050 inch, argon cover gas and 14 cfh gas flow rate.

Figure 4A:
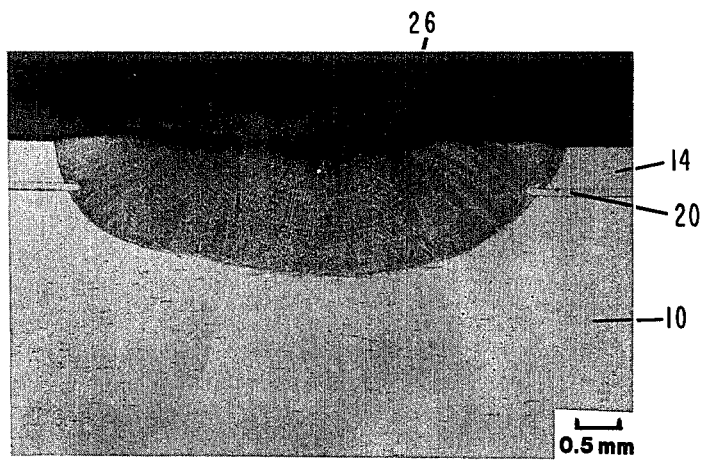
FIG. 4A is a photomicrograph of a defect-free weld nugget fabricated according to the present invention.
Figure 4B:
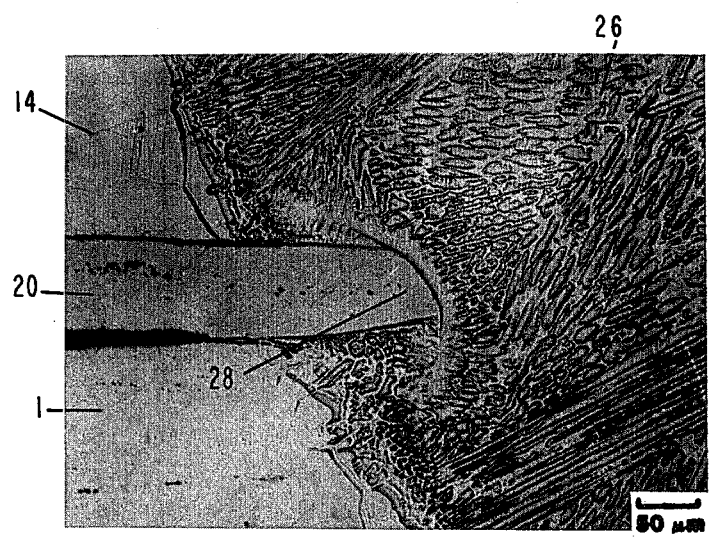
FIG. 4B is a higher magnified photomicrograph of a portion of the weldment as shown in FIG. 4A.

In FIGS. 4A and 4B are shown photomicrographs of the resulting welds with the scale inscribed at the lower righthand corners thereof. The weldment 26 as shown in FIGS. 4A and 4B is defect free and joins alloy D9 austenitic stainless steel members 10 and 14 which have a melting point lower than that of pure iron. Alloy D9, when it is at a temperature just below the solidus temperature, includes at most only a very minor proportion of a delta ferrite, as explained hereinafter. The weldment comprises a weld negget 26 which in turn comprises portions of the member 14 and the member 10 which have been melted and then solidified in an inert gas environment. The thin iron shim 20 is positioned intermediate the members 14 and 10 proximate the weld nugget 26 and small unmelted portions 28 of the thin iron member 20 project into the weld nugget 26. As will be explained hereinafter, the portions of the weld nugget 26 which are proximate the projecting portions 28 of the thin foil-like member are relatively rich in iron in order that delta ferrite is formed proximate the foil-like member projecting portions 28 during solidification of the weld nugget.

Figure 5A:
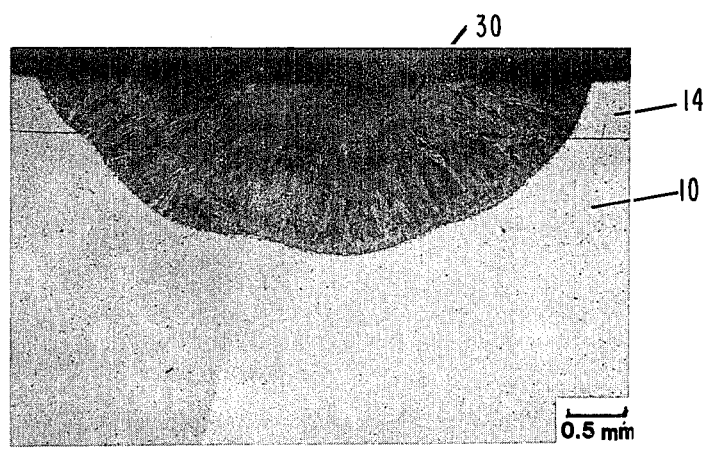
FIG. 5A is a photomicrograph of a defective weldment which was fabricated using generally conventional welding practices.
Figure 5B:
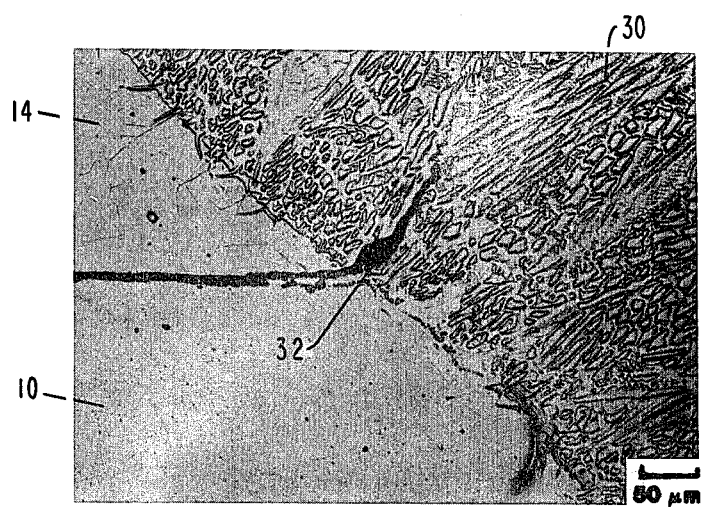
FIG. 5B is a photomicrograph of a portion of the weldment shown in FIG. 5A, but at a higher magnification in order to illustrate the defect.

In FIGS. 5A and 5B are shown similar photomicrographs of a weldment 30 joining alloy D9 members 10 and 14 which have been GTAW welded, but without the interposed iron shim. Reference to FIG. 5B illustrates the resulting defect 32 which occurs in the weld nugget 30 proximate the jointure of members 10 and 14.

Figure 6:
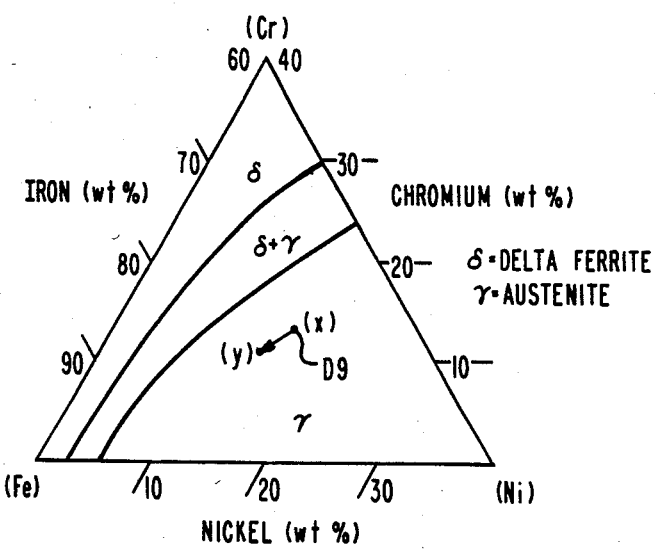
FIG. 6 is an iron-rich corner of the Fe-Ni-Cr ternary system, just below the solidus temperature, having inscribed thereon two different phases of iron which are present and compositional ranges for certain stainless steels.
Figure 7:
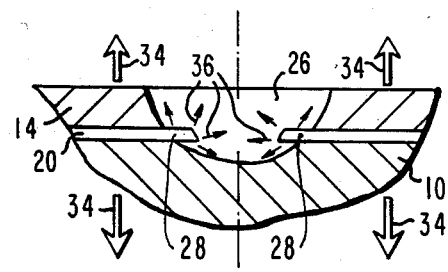
FIG. 7 is a schematic representation, partly in section, showing the shrinkage strains and direction of solidification for a weldment fabricated in accordance with the present invention.
Figure 8:
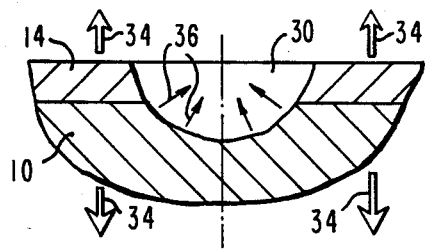
FIG. 8 is a schematic view corresponding to FIG. 7 but showing the similar shrinkage strains and direction of solidification for a weldment fabricated in accordance with generally conventional prior art practices.

The explanation for the success of the present process in producing defect-free welds can best be explained by referring to FIGS. 6–8. FIG. 6 sets forth the iron-rich corner of the iron-nickel-chromium ternary system, just below the solidus temperature, showing the location of alloy D9 in the austenitic phase (x) and the compositional change (y) after the addition of the pure iron as the foil member 20. When the foil member 20 is fused, however, the concentration of iron around the projecting portions 28 of the foil-like member 20 is close to 100% thus providing ample delta ferrite during solidification of the weld at the most critical location in the joint. In addition, the presence of the iron foil projecting portions 28 in the weld nugget 26 causes a change in the solidification pattern so that the zone where cracking previously occurred is the first part of the weld to freeze or solidify. As shown in FIG. 6, with an iron-rich composition there is formed during solidification the delta ferrite, indicated as (δ). As the concentration of iron decreases, there is formed during solidification a mixture of delta ferrite and austenite or gamma phase, indicated as (δ+γ). With still lower concentrations of iron, substantially only the gamma phase (γ) is present during solidification.

In FIG. 7 is shown a schematic diagram for the shrinkage strains and solidification geometries for a weld joint with the iron foil and FIG. 8 shows a similar weld joint but without the iron foil. In FIG. 7 the shrinkage strains are shown by the enlarged arrows 34 and the solidification geometries which emanate from the iron foil projecting portions 28 are shown by the smaller arrows 36 within the weld nugget 26.

A similar weld but without the addition of the iron foil 20 produces similar shrinkage strains, but the solidification occurs from the bottom peripheral portions of the weld nugget 30 with resulting defects most apt to occur at the joint between the members 10 and 14.

As explained hereinbefore, the presence of delta ferrite at the critical areas precludes the problem of solidification cracking. It is also believed that when two-phase gamma and delta solidification occurs, manganese sulfide inclusions are formed in conjunction with the delta ferrite. This occurs because manganese is not as soluble in delta ferrite as in austenite, and it is released during solidification of the delta phase to combine with minor sulfide impurities. Also, the refined nature of the two-phase structure causes sulfides and phosphides to be more uniformly distributed throughout the weld metal. It thus appears that the role of delta ferrite is therefore twofold, namely the elimination of the formation of interdendritic films and to provide a "cushion" which reduces the tensile stresses developed across the interdendritic boundaries by the contracting austenite, the ferrite having a lower temperature of contraction.

While the weldment as described hereinbefore is particularly adapted for welding a relatively thin austenitic stainless steel member to a heavier such member, the iron shim could also be used for welding other types of austenitic stainless steel members in order to insure the presence of sufficient delta ferrite during solidification. While the specific example has considered stainless steel members which include about 13 weight percent chromium an about 15 weight percent nickel, the teachings can obviously be applied to other types of stainless steels, especially those having a high nickel content.

In some cases, it may be desirable to operate the resulting structure at temperatures greater than 600° C. and in such case, the pure iron shim 20 can be replaced by an iron foil alloy which contains limited amounts of chromium, nickel, or other alloying element means in order that the oxidation resistance of the resulting weldment is improved. The amount of chromium or other elements added can vary widely as long as the melting point of the shim 20 remains higher than the melting point of the steel members to be welded together.

It may also be desired to increase the mechanical strength of the weldment by the addition to the shim 20 of small amounts of carbon, nitrogen, manganese, silicon or other alloying element means which are known to increase strength. The added amounts of such elements should be controlled so that the shim 20 has a melting point which is higher than the melting point of the steel members to be welded.

We claim:

1. A defect-free weldment joining austenitic steel members which have a melting point lower than that of pure iron and which, when just below the solidus temperature, include at most only a very minor proportion of delta ferrite, said weldment comprising:

a weld nugget joining one of said stainless steel members to the other of said stainless steel members, said weld nugget comprising portions of said one member and said other member which have been melted and then solidified in an inert gas environment; and a thin foil-like member substantially comprising iron positioned intermediate said one member and said other member proximate said weld nugget, said thin foil-like member having a melting point which is greater than the melting points of said stainless steel members, small unmelted portions of said thin foil-like members projecting into said weld nugget, and the portions of said weld nugget proximate said projecting portions of said thin foil-like member being relatively rich in iron; whereby delta ferrite is formed proximate said thin foil-like member projecting portions during solidification of said weld nugget.

2. The weldment as specified in claim 1, wherein said one member is relatively thin and said other member comprises the support for said one member.

3. The weldment as specified in claim 2, wherein said stainless steel members include about 13 wt % Cr and 15 wt % Ni.

4. The weldment as specified in claim 1, wherein said thin foil-like member is pure iron.

5. The weldment as specified in claim 3, wherein said thin foil-like member is pure iron.

6. The weldment as specified in claim 1, wherein said thin foil-like member has the composition of iron with a limited amount of alloying element means.

7. The weldment as specified in claim 6, wherein said alloying element means is chromium.

8. The weldment as specified in claim 3, wherein said thin foil-like member has the composition of iron with a limited amount of alloying element means.

9. The weldment as specified in claim 3, wherein said alloying element means is chromium.

10. The method of welding two austenitic stainless steel members which have a melting point lower than that of pure iron and which, when just below the solidus temperature, include at most a very minor proportion of delta ferrite, one of said stainless steel members being relatively thin, and the other of said stainless steel members after welding comprising the support for said one member, which method comprises:

placing between the portions of said stainless steel members which are to be welded, a thin foil-like member substantially comprising iron, and retaining in fixed and abutting relationship said stainless steel members and said thin foil-like member which is positioned therebetween, with one surface of said one stainless steel member being exposed;

placing proximate the exposed surface of said one stainless steel member and proximate the portion thereof to be welded a gas tungsten-arc welding torch, and maintaining an inert gas environment about said welding torch and the proximate exposed surface of said one stainless steel member;

applying an arc welding potential to said welding torch to heat to fusion the proximate portion of said one stainless steel member and also the portion of said other stainless steel member which is proximate thereto, with a substantial portion of said foil-like member which is proximate said fused stainless steel member portions also being melted to form a molten weld nugget; and retaining said stainless steel members in fixed and abutting relationship during solidification and cooling to provide a weld nugget, with small unmelted portions of said higher-melting-point thin foil-like member remaining and projecting into said weld nugget; whereby the portions of said foil-like member which project into said solidified weld nugget have proximate thereto solidified weld nugget portions which are rich in iron and which display substantial delta ferrite when just below the solidus temperature of said weld nugget.

11. The method as specified in claim 10, wherein said stainless steel members include about 13 wt % Cr and 15 wt % Ni.

12. The method as specified in claim 10, wherein said thin foil-like member is pure iron.

13. The method as specified in claim 11, wherein said thin foil-like member is pure iron.

14. The method as specified in claim 10, wherein said thin foil-like member has the composition of iron with a limited amount of alloying element means.

15. The method as specified in claim 14, wherein said alloying element means is chromium.

16. The method as specified in claim 11, wherein said thin foil-like member has the composition of iron with a limited amount of alloying element means.

17. The method as specified in claim 16, wherein said alloying element means is chromium.

* * * * *